Dec. 30, 1958 E. D. GEORGE ET AL 2,866,500
METHOD AND APPARATUS FOR SIPING TIRES
Filed Dec. 22, 1955 12 Sheets-Sheet 1

INVENTORS
EVERETT D. GEORGE
HAROLD H. CLARK
BY
P.L. Miller
ATTORNEY

Dec. 30, 1958  E. D. GEORGE ET AL  2,866,500
METHOD AND APPARATUS FOR SIPING TIRES
Filed Dec. 22, 1955  12 Sheets-Sheet 2
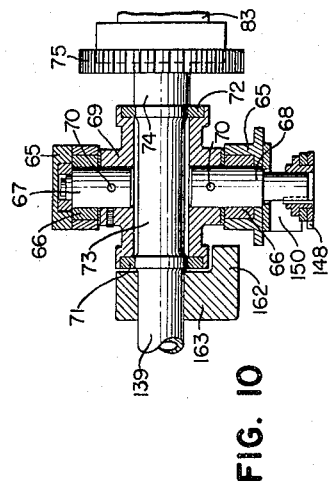
FIG. 10
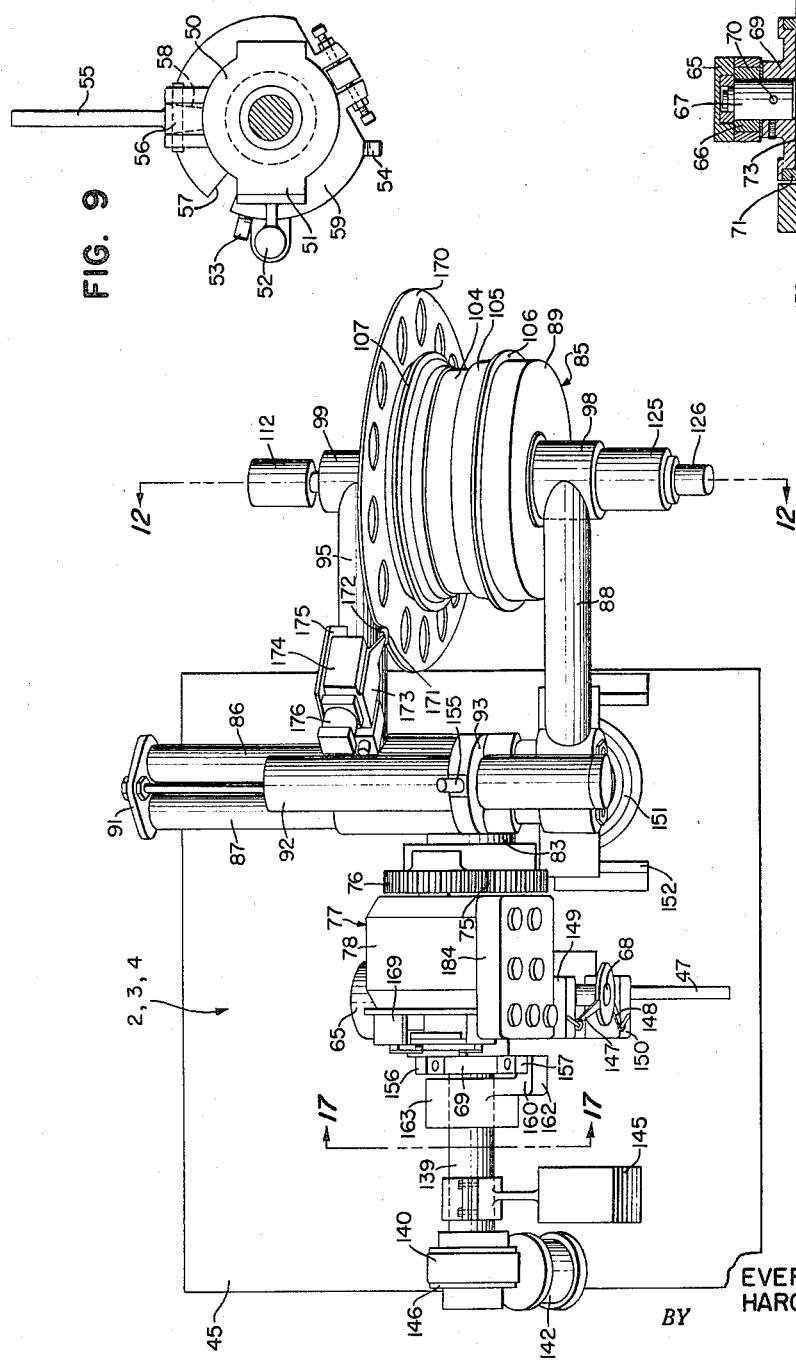
FIG. 9
FIG. 2
INVENTORS
EVERETT D. GEORGE
HAROLD H. CLARK
BY
R. L. Miller
ATTORNEY

INVENTORS
EVERETT D. GEORGE
HAROLD H. CLARK

ATTORNEY

Dec. 30, 1958 E. D. GEORGE ET AL 2,866,500
METHOD AND APPARATUS FOR SIPING TIRES
Filed Dec. 22, 1955 12 Sheets-Sheet 6

INVENTORS
EVERETT D. GEORGE
HAROLD H. CLARK
BY
R. L. Miller
ATTORNEY

Dec. 30, 1958   E. D. GEORGE ET AL   2,866,500
METHOD AND APPARATUS FOR SIPING TIRES
Filed Dec. 22, 1955   12 Sheets-Sheet 7
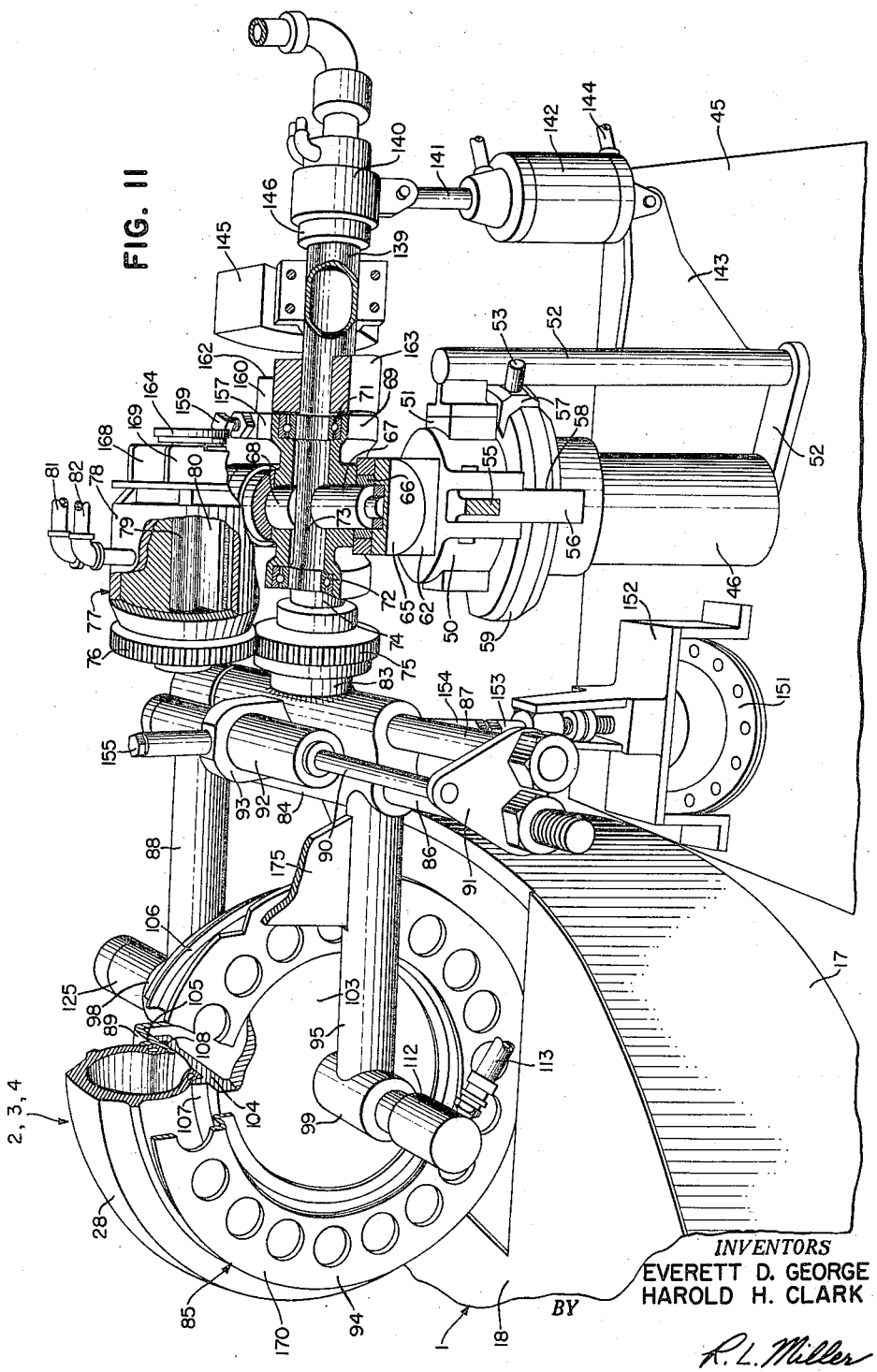
INVENTORS
EVERETT D. GEORGE
HAROLD H. CLARK
BY
R. L. Miller
ATTORNEY Dec. 30, 1958   E. D. GEORGE ET AL   2,866,500
METHOD AND APPARATUS FOR SIPING TIRES
Filed Dec. 22, 1955   12 Sheets-Sheet 8

INVENTORS
EVERETT D. GEORGE
HAROLD H. CLARK
BY
R. L. Miller
ATTORNEY

INVENTORS
EVERETT D. GEORGE
HAROLD H. CLARK
BY
ATTORNEY

*INVENTORS*
EVERETT D. GEORGE
HAROLD H. CLARK
BY
*R. L. Miller*
ATTORNEY

Dec. 30, 1958     E. D. GEORGE ET AL     2,866,500
METHOD AND APPARATUS FOR SIPING TIRES

Filed Dec. 22, 1955     12 Sheets-Sheet 11

*INVENTORS*
EVERETT D. GEORGE
BY   HAROLD H. CLARK

*R. L. Miller*
ATTORNEY

Dec. 30, 1958    E. D. GEORGE ET AL    2,866,500
METHOD AND APPARATUS FOR SIPING TIRES
Filed Dec. 22, 1955    12 Sheets-Sheet 12

INVENTORS
EVERETT D. GEORGE
HAROLD H. CLARK
BY
P. L. Miller
ATTORNEY

United States Patent Office 2,866,500
Patented Dec. 30, 1958

2,866,500

METHOD AND APPARATUS FOR SIPING TIRES

Everett D. George and Harold H. Clark, Cuyahoga Falls, Ohio, assignors to The Goodyear Tire & Rubber Company, Akron, Ohio, a corporation of Ohio Application December 22, 1955, Serial No. 554,854

32 Claims. (Cl. 164—10.2)

This invention relates to a method and apparatus for treating tire treads, and more particularly it relates to a method and apparatus for slitting tire treads transversely for the purpose of improving the anti-skid properties of the tread.

An object of this invention is to provide an economical, automatic, high-speed device for slitting tires which is adaptable to slit two or more tires simultaneously.

A further object is to provide an apparatus for slitting tire treads which is adaptable to slit tires of various sizes and having means for insuring accurate depth of cut.

Another object is to provide an apparatus for slitting tire treads having means for preventing the cutting knife from gouging a shoulder of the tire during initial and final contact with the tire.

Another object of this invention is to provide a method and apparatus for slitting only the shoulder portions of the tire.

These and other objects and advantages will appear more fully in the following detailed description and in the accompanying drawings in which:

Fig. 2 is an enlarged plan view of one of the tire holding and supporting units shown in Fig. 2;

Fig. 9 is a sectional view taken along the lines 9—9 of Fig. 3;

Fig. 10 is a sectional view taken along the lines 10—10 of Fig. 3;

Fig. 11 is an isometric view with parts broken away and in section showing the chuck and main shaft of the tire holding and supporting unit.

Figure 1:
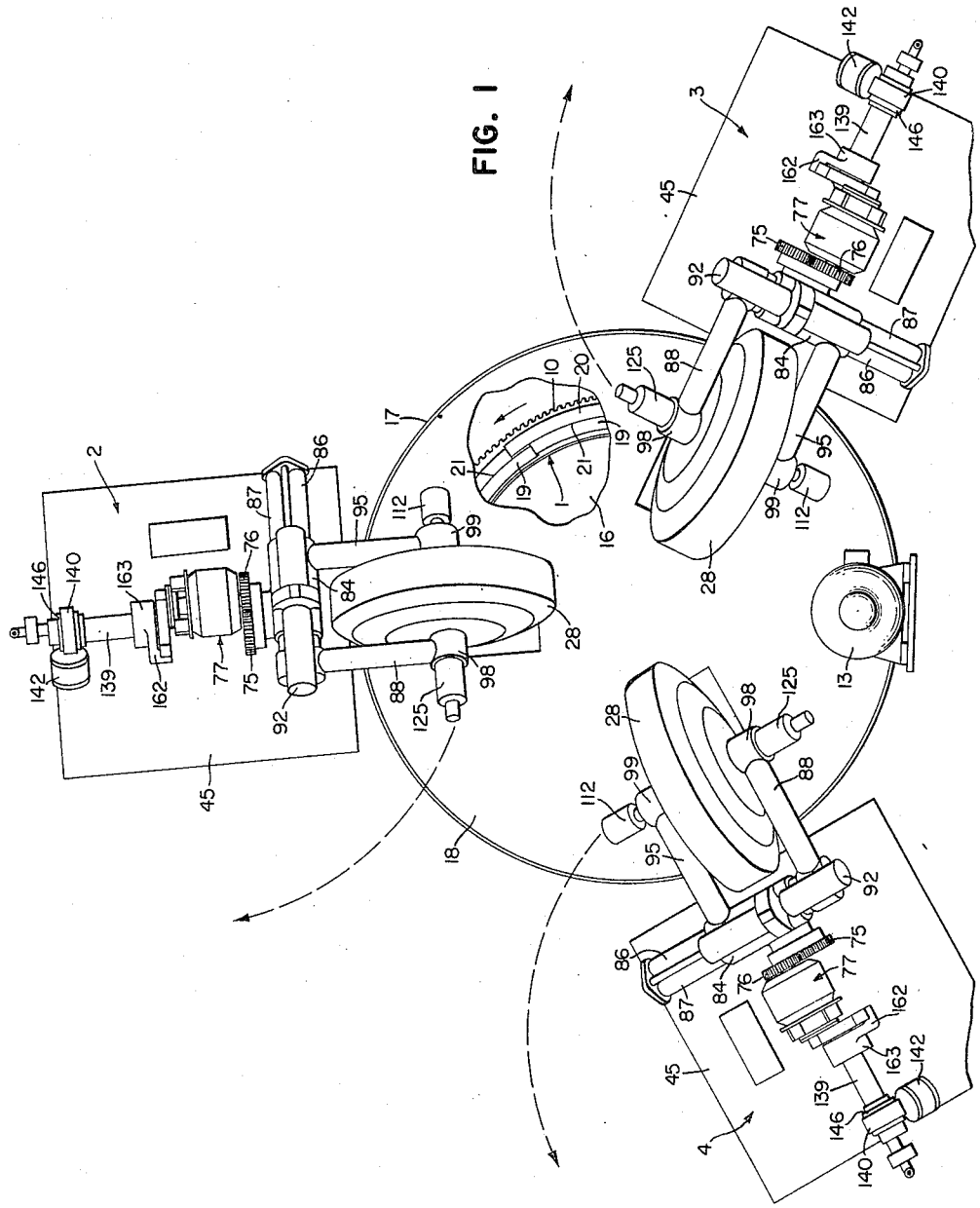
Fig. 1 is a plan view of the tire slitting machine embodying a preferred form of this invention.

Referring to Fig. 1 of the drawings, the apparatus consists of a continuously rotating knife carriage 1 and several tire chucking and supporting mechanisms 2, 3, and 4 which are spaced circumferentially around the rotating knife carriage, as shown in Fig. 1 of the drawings, to permit several tires to be slit simultaneously.

Knife and drive mechanism

Figure 8:
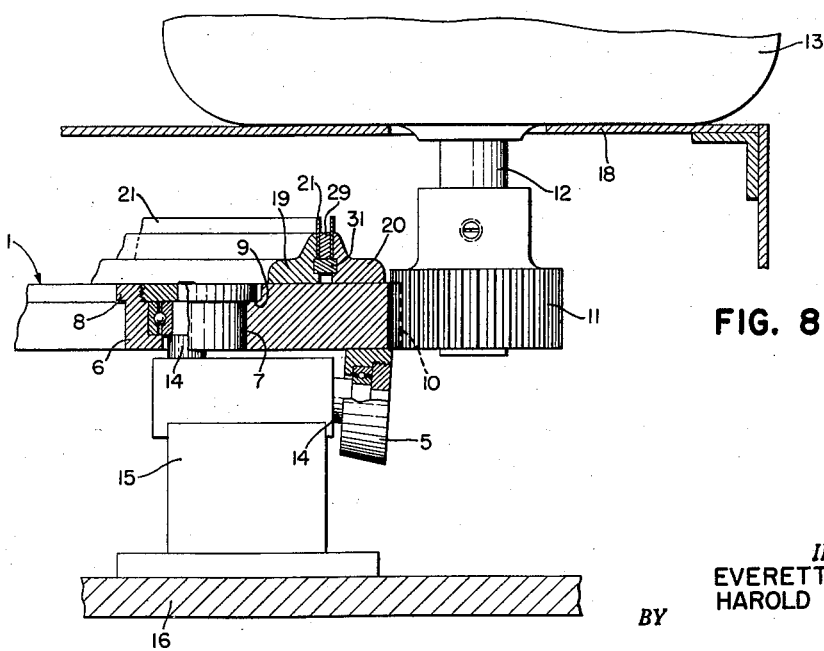
Fig. 8 is a sectional view taken along the lines 8—8 of Fig. 6, with the drive gear being shown.

The knife carriage 1 has a diameter larger than the tires to be cut and is supported for rotation in a fixed plane upon rollers 5 rotating about a horizontal axis and rollers 6 rotating about a vertical axis. As shown in Fig. 8, the rollers 6 contact the radial inner surface 7 of the carriage to prevent lateral movement of the carriage and are further provided with a flange 8 contacting a flange 9 on the carriage so as to prevent vertical movement of the carriage. The outer periphery of the carriage is provided for gear teeth 10 which engage with the gear 11 attached to the drive shaft 12 of the motor 13. The rollers 5 and 6 are supported on stub shafts 14 secured to stands 15 which are circumferentially spaced from each other. The stands 15 are secured to the base plate 16 which is provided with sides 17 and a face plate 18 to form an enclosure about the cutting carriage.

A plurality of segmental arcuate knife holders 19 and 20 are secured to the ring-shaped carriage 1 to hold a plurality of knives or cutters 21 in eccentric or helical relation to the center of the carriage. The radial inner holders 19 are each respectively secured to carriage 1 by a single bolt 22 located approximately midway of the length of the holder 19. The radial outer holders 20 are each respectively secured to the carriage 1 by a single bolt 23 located near the leading edge 24 of each knife or cutter 21 which are clamped between the holders. The laterally adjacent holders 19 and 20 of equal length are secured together by bolts 25 and are shorter in length than the knives 21. The holders are also offset longitudinally relative to each other so that the leading edge 24 of the knife bears laterally against the holder 19 while the trailing edge 26 of the knife bears against the holder 20. The respective leading and trailing edges 24 and 26 of the longitudinally adjacent knives are spaced apart a distance equal to the spacing between the individual slits 27 desired to be cut on the tire 28 by means of a spacer member 29 interposed therebetween. The spacer 29 is secured to the knives by bolts 30 which pass through the holders 19 and 20 and the leading edge 24, and trailing edge 26 of longitudinally adjacent knives. A key 31 having a length equal to the knives 21 is positioned in a keyway formed in the contacting surfaces of the holders and provides a base for supporting the lower edge of the knives to maintain the exposed or cutting edges in a fixed plane relative to the holders.

It is evident that one revolution of the carriage will impart a number of slits 27 to the tread of the tire 28 equal to the number of cutters secured to the carriage, and as the leading edge 24 of any one of the cutters completes a cut, the cutter will follow through the slit and displace the tire tread a distance equal to the distance between the respective overlapping trailing and leading edges 26 and 24 of the cutters before the next succeeding leading edge begins a new cut.

Furthermore, it is evident that the spacing between the slits 27 may be varied by replacing the spacer 29 with another spacer having a thickness equal to the desired spacing of the slits. In the event that the spacing of the slits 27 is to be increased, the bolts 30 and 23 are removed and a spacer of greater thickness is interposed between the leading and trailing edges of the knives. It is seen that the holders will pivot about bolts 22 in a clockwise direction so that the distance between the leading and trailing edge is increased to accommodate the spacer of increased thickness.

At each of the cutting stations a spray nozzle 32 is provided at each side of the cutting knife carriage 1 through which water or other suitable cutter lubricant and cooling fluid may be sprayed. The enclosure formed by the base, sides and face plate prevents the lubricant from escaping and provides a sump tank from which the lubricant may be drained through a suitable outlet and recirculated through the nozzles.

Tire tread support and depth control

Figure 15:
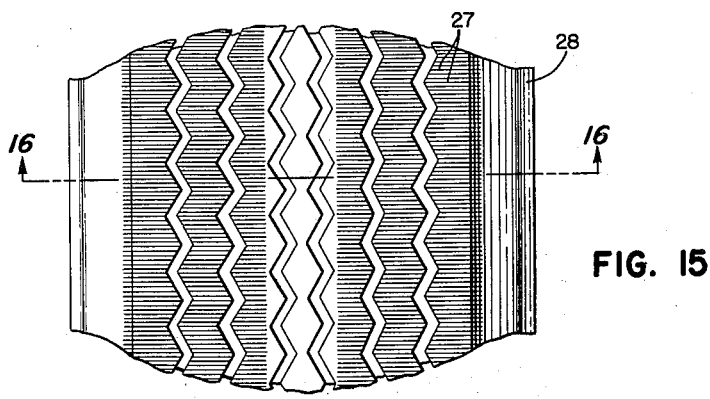
Fig. 15 is a plan view of a tire tread showing a portion slit by the apparatus of this invention.
Figure 16:
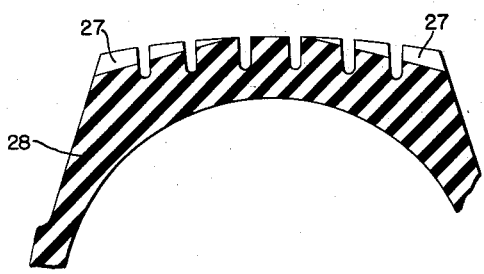
Fig. 16 is a sectional view of the tire shown in Fig. 15 and taken along the lines 16—16 of Fig. 15.
Figure 21:
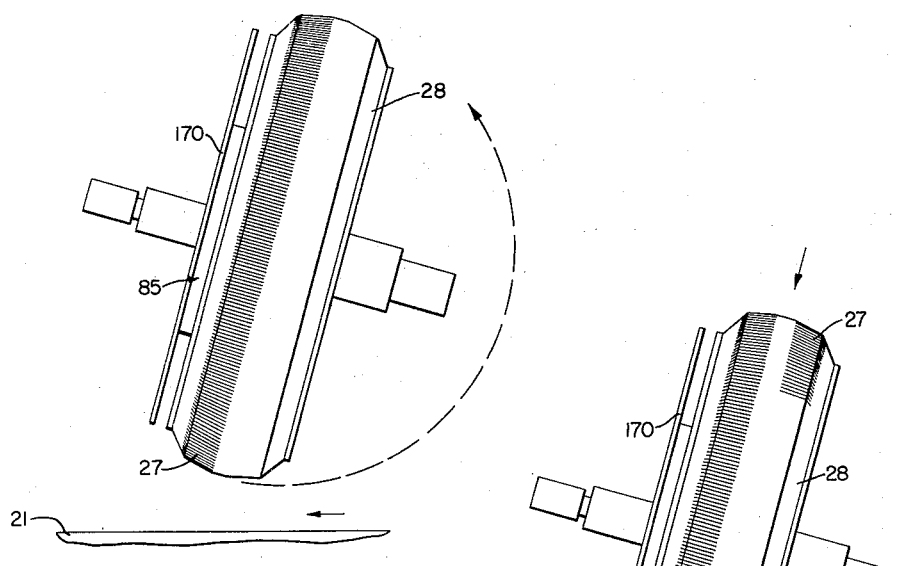
Fig. 21 is a partial elevational view similar to Fig. 19 showing the tire turned 180° after the first shoulder has been cut.

Although this invention is illustrated and described for cutting slits 27 partly across the tread of a tire 28, in the manner shown in Figs. 15 and 16, with the slits 27 extending transversely thereof from each shoulder and being deeper at the shoulder, it is obviously adaptable to cut a tire transversely across the entire tread and at constant depth. The invention as illustrated is adapted to automatically cut slits 27 only through the shoulder portions of the tire 28 with the slits 27 having a greater depth at the shoulder than at the center of the tire. Since the carriage and knife rotate in a fixed plane, the tire holding and manipulating units 2, 3, and 4 positioned respectively at each of several siping stations function, as hereinafter described, to position the tire chuck radially outward of the knife so that the tire 28 may be placed on the chuck, to rotate the chuck over the cutter and hold the tire at a fixed angle thereto, to lower the tire onto the knife, to raise the tire off the knife after one side has been slit, to rotate the tire 180° so that the opposite shoulder of the tire is in position to be slit and to lower the tire onto the knife before and after the opposite shoulder has been slit.

Figure 7:
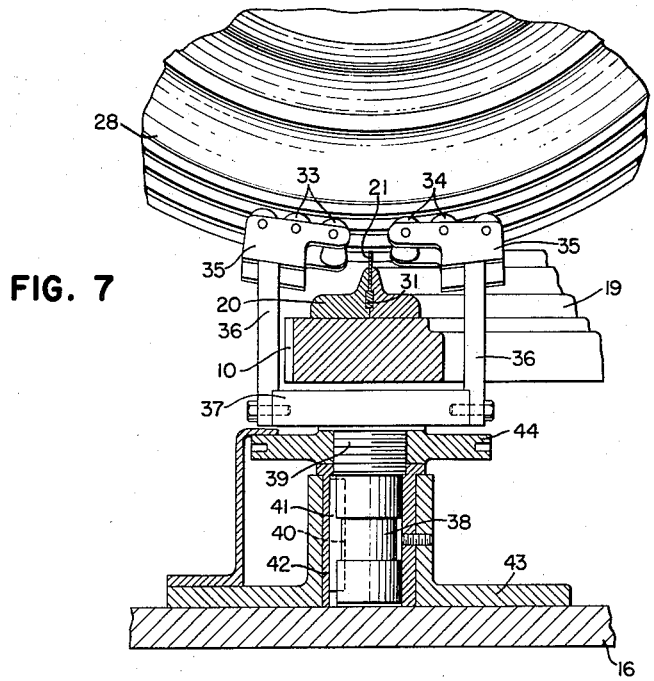
Fig. 7 is a sectional view taken along the lines 7—7 of Fig. 6 and showing a tire in slitting position.
Figure 12:
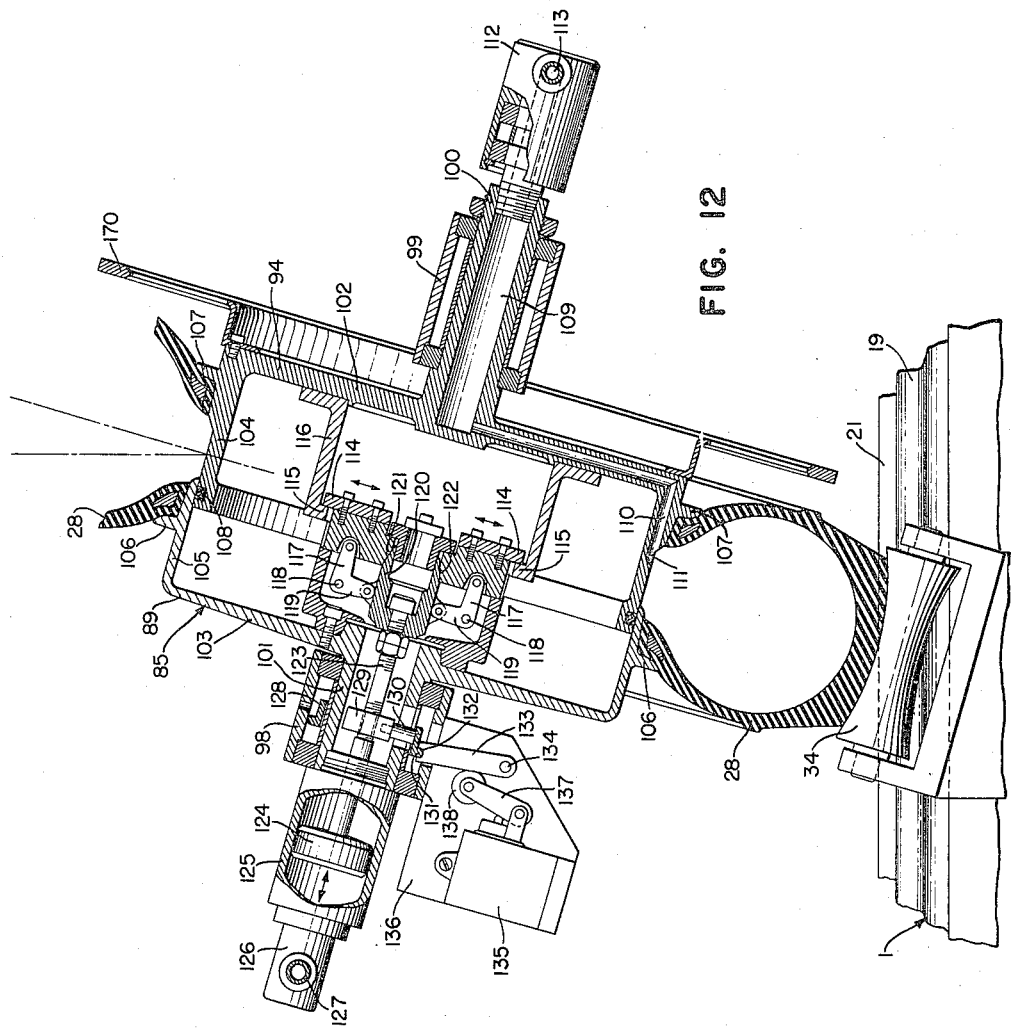
Fig. 12 is a sectional view taken along the lines 12—12 of Fig. 2.

A tire tread support and cutting depth control mechanism is associated with each of the tire holding units 2, 3, and 4 and consists of a set of freely rotatable rollers 33 and 34 mounted at each side of the rotating knives. As shown in Figs. 7 and 12 the knife passes between the two sets of rollers 33 and 34 which are held in a plane parallel to the tread surface of the tire 28 by the supporting brackets 35 secured to the vertical holders 36. Each of the holders 36 are bolted to the upper flange 37 of shaft 38. The upper end of the shaft 38 is provided with threads 39 and the lower end thereof is provided with a plurality of slots 40. A key 41 is secured to bushing 42 so that the shaft 38 is slidable relative to its axis. The bushing 42 is suitably secured to a base 43 fastened to the plate 16. A ring 44 threadedly engaging the shaft 38 is provided and it is seen that rotation of the ring 44 causes the shaft and the roller holders 36 to be raised or lowered.

During the cutting operation the tread of the tire 28 is in engagement with the rollers 33 and 34 which accurately position the plane of the tread relative to the plane of the knife and stabilize the tread against movement during the slitting operation. As previously indicated, both the tire chuck and the rollers 33 and 34 are mounted for free rotation so that, as the trailing and leading edges of the knives 21 displace the tire tread and revolve the tire 28 about its own axis, very little frictional resistance to such movement is imparted by the rollers 33 and 34 or by the chuck. In addition, it is obvious that the rollers 33 and 34 may be raised or lowered relative to the plane of the knife 21 so that the depth of the slits 27 may be increased or decreased.

Tire holding and manipulating units

Figure 3:
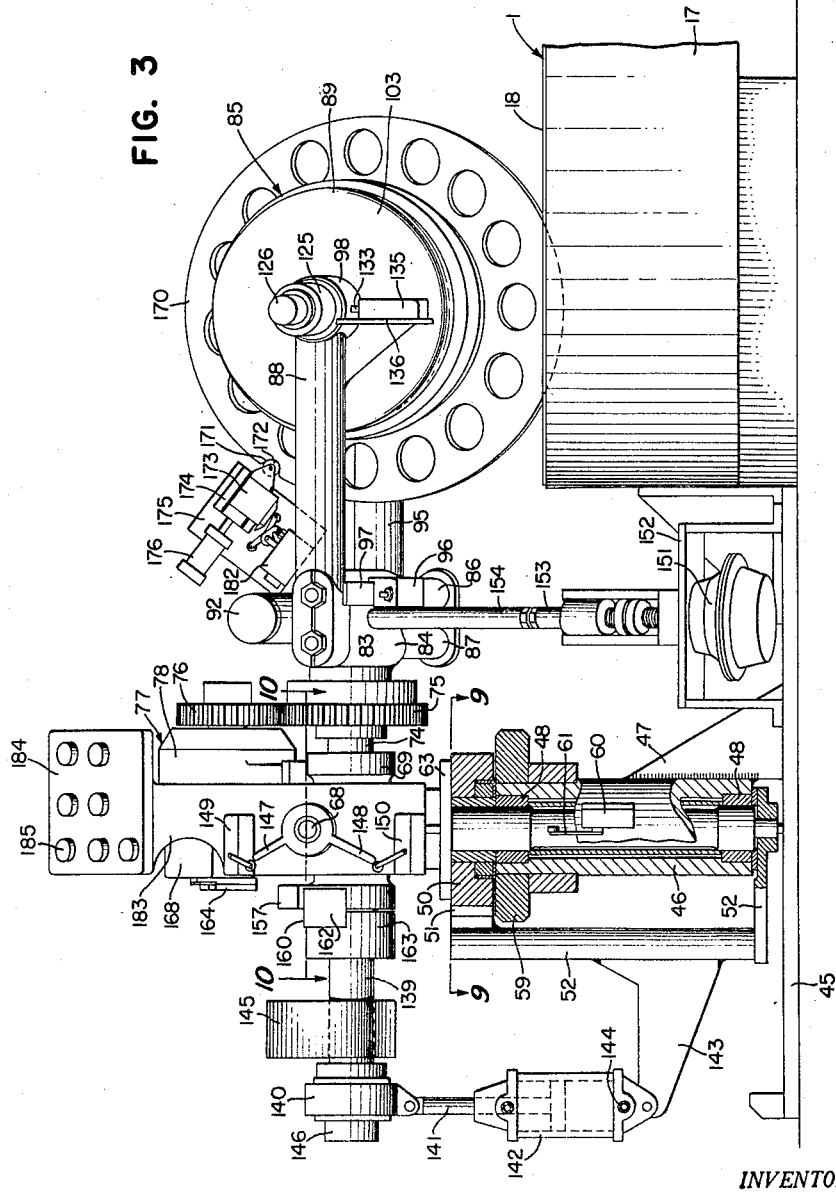
Fig. 3 is a side elevational view with parts broken away of the unit shown in Fig. 2.
Figure 4:
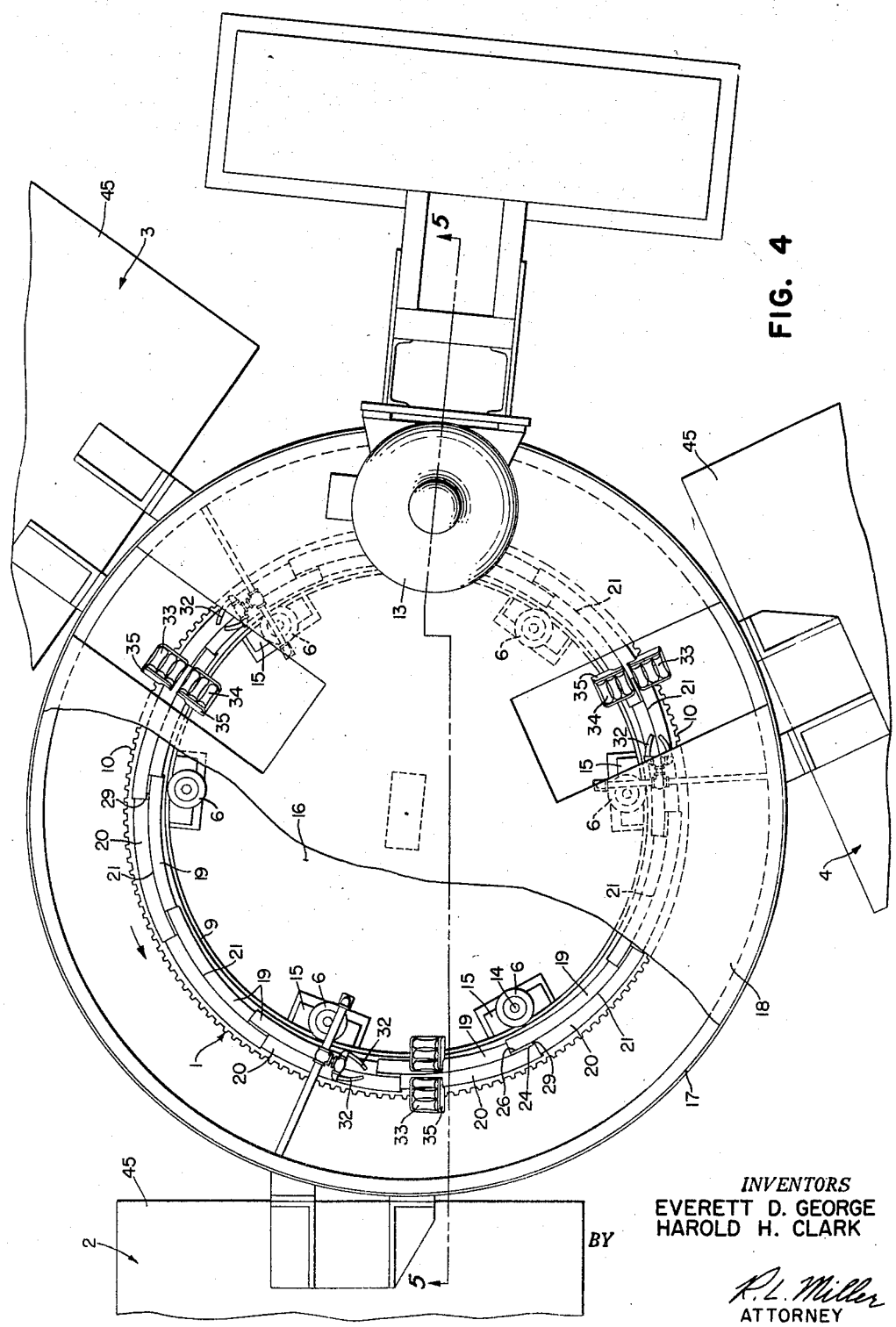
Fig. 4 is a plan view of the slitting machine with parts broken away showing the knife carriage and drive therefor.
Figure 5:
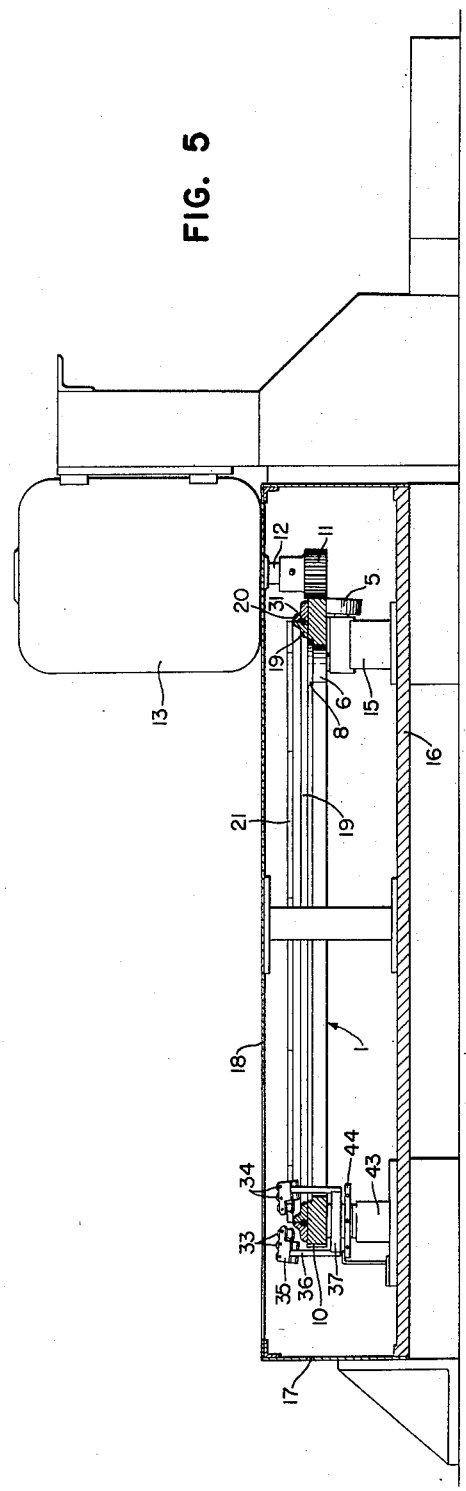
Fig. 5 is a cross-sectional view taken along the lines 5—5 of Fig. 4.
Figure 6:
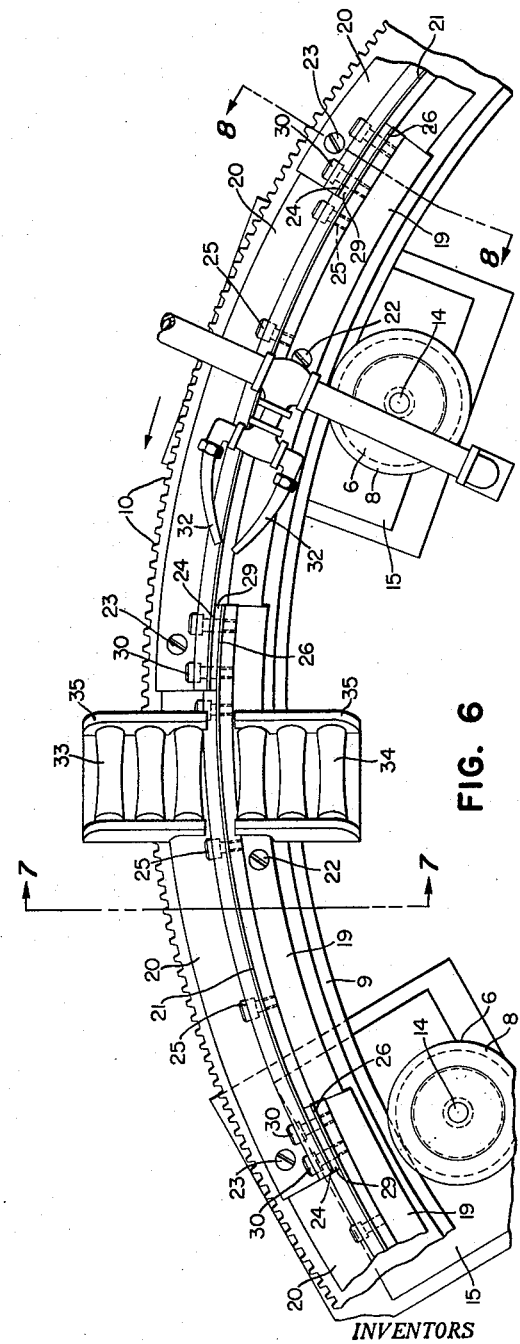
Fig. 6 is an enlarged partial plan view of the knife carriage and tire tread support.
Figure 18:
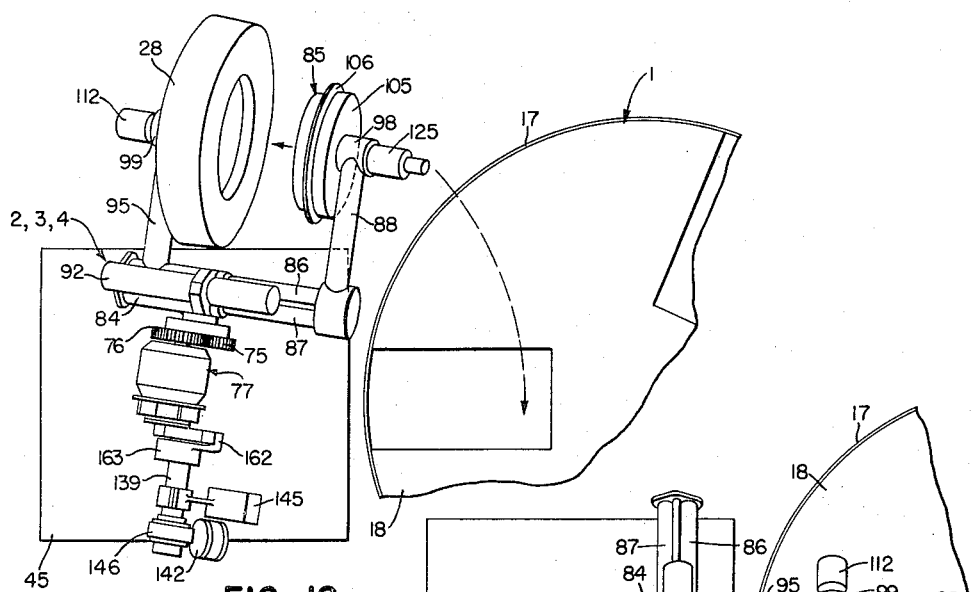
Fig. 18 is a partial plan view of the apparatus of this invention showing the tire holding and supporting unit in loading position.
Figure 19:
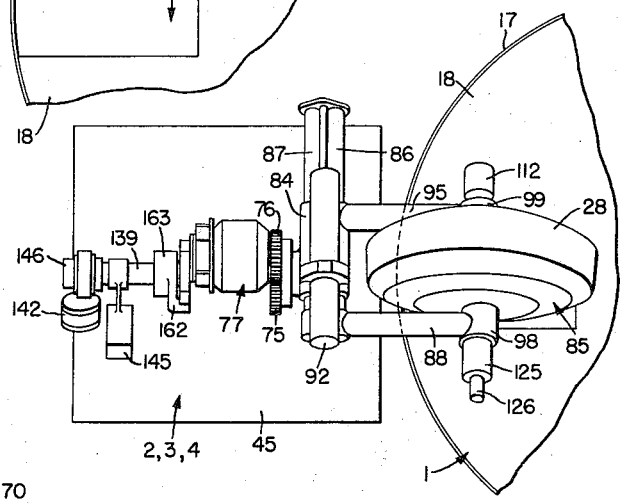
Fig. 19 is a view similar to Fig. 18 showing the unit in slitting position.
Figure 20:
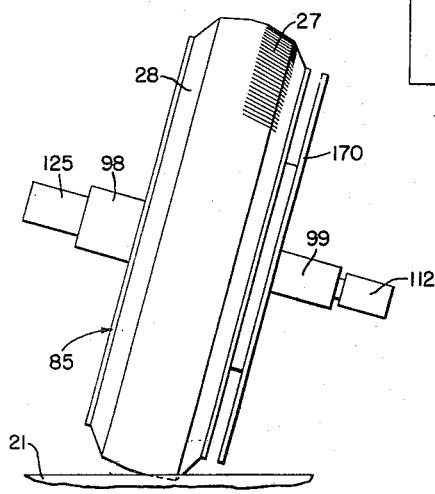
Fig. 20 is a partial elevational view similar to Fig. 19 showing the tire in engagement with the knife.

As indicated above, a tire holding and manipulating unit 2, 3, and 4 is provided at each of several cutting stations. The structure and operation of the units are identical so that the description will be restricted to unit 2. A base plate 45 is secured to the side 17 and is provided with a stand 46 secured to the plate 45 by means of several vertically disposed plates 47, as shown in Fig. 3. The stand 46 is provided with a bearing 48 having a vertical main shaft journaled therein a collar 50 is secured to the upper end of the shaft 49 having a radial lug 51 which is secured to the lower end of the shaft 49 by means of a vertical arm 52. The arm 52 bears against one of the stops 53 and 54 shown in Fig. 9 which project radially from the stand 46 so as to limit the rotation of the shaft 49. When the arm 52 is positioned against pin 53, as shown in Fig. 9, the tire holding and manipulating unit is in siping position with the tire 28 disposed over cutters 21 as shown in Fig. 19. With the arm 52 bearing against pin 54 the tire 28 is in loading position on as shown in Fig. 18.

Each of the holding and manipulating units 2, 3, and 4 is manually rotated into slitting and loading positions by means of the operating lever 55 which is pivotably secured to the collar 50 and is provided with a depending lug 56 adapted to be positioned within either of the radial slots 57 and 58 provided in the fixed collar 59 which is secured to the stand 46. In order to rotate the unit from the loading to slitting position the operator pivots the lever so as to disengage the depending lug 56 from the slot 57 and pushes the lever circumferentially of the axis of the stand 46 to thereby rotate the unit until the arm 52 engages the pin 53 and the depending lug 56 is lowered into engagement with the slot 58 to thereby lock the unit in the slitting position. A microswitch 60 is secured to the stand 46 and is closed by the lug 56 contacting arm 61 when the lever 55 is locked in slitting position.

Figure 17:
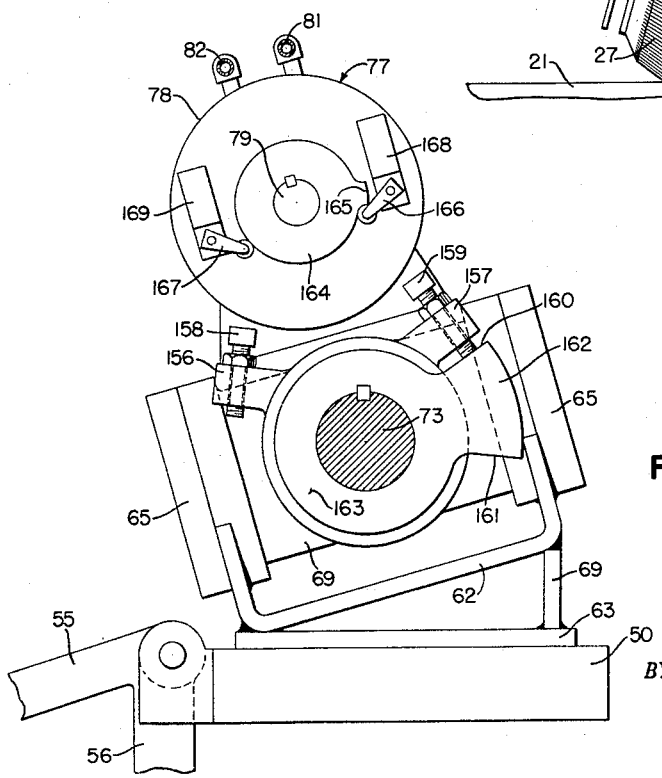
Fig. 17 is a sectional view taken along the lines 17—17 of Fig. 2.

The collar 50 is provided with a U-shaped bracket 62 as shown in Fig. 17 which is welded to the top plate 63 by means of leg 64 so that the base of the bracket 62 is positioned at an angle relative to the top plate corresponding to the angle of the plane of the tire 28 relative to a vertical plane during the slitting operation. A pair of aligned rings 65 are secured to the bracket 62 having bearings 66 which support respectively stub shafts 67 and 68. The housing 69 is secured to the stub shafts by means of pins 70 so that the housing 69 is pivotably mounted on the rings 65 about the axes of the stub shafts 67 and 68. The housing 69 is provided with bearings 71 and 72 and the main shaft 73 is journaled therein as shown in Fig. 10. It is seen, then, that the shaft 73 is rotatable about its own axis within the bearings 71 and 72, pivotably supported about the axes of the stub shafts 67 and 68 and rotatable in a horizontal plane about the vertical axis of the shaft 49.

Referring now to Fig. 11 of the drawings, the forward end 74 of the main shaft 73 is provided with a gear 75 meshing with the gear 76 which is driven by a pneumatic torque unit 77 secured to the housing 69. The main shaft 73 is thereby rotated about its own axis for approximately 180° after one side of the tire tread has been completely slit as will be more fully explained hereinafter. The torque unit 77 comprises a cylindrical body 78 supporting a shaft 79 having a radially extending vane 80 attached thereto. High pressure air is admitted through either of the inlets 81 and 82 to rotate the shaft 79 in a clockwise or counter-clockwise direction, as described and shown in United States Patent 1,971,651.

The extreme forward end 83 of the main shaft 73 is welded or otherwise secured to housing 84 which supports the tire chucking mechanism 85. The housing 84 is bored lengthwise thereof to reciprocally support twin rods 86 and 87 which are connected to one end to a strut 88 which supports the movable head 89 of the tire chuck 85. The other ends of the rods 86 and 87 are secured to a piston rod 90 by means of the connecting plate 91 and the piston rod is actuated by the pneumatic cylinder 92 supported on the housing 84 by means of a plate 93. The fixed head 94 of the tire chuck 85 is supported on a strut 95 which is welded to the housing 84 and extends parallel to the strut 88. A microswitch 96 is secured to the housing 84 and is actuated when the chuck 85 is in closed position by contact with a lug 97 secured to the strut 88. The outer ends of the struts 88 and 95 are provided with journaled rings 98 and 99 respectively which rotatably support stub shafts 100 and 101 as shown in Fig. 12. The stub shafts are secured respectively to circular plates 102 and 103 having telescoping cylindrical flanges 104 and 105 each of which is provided with an annular tire bead flange 106 and 107. The outer surface of the flange 104 is provided with an O-ring 108 which seals against the under-surface of flange 105 when the chuck is closed. The stub shaft 100 is further provided with a bore 109 communicating with an axial bore 110 in the flange 104 which terminates in an opening 111 through which inflationary air may be admitted internally of the tire when mounted between the flanges 106 and 107 of the chuck. Inflationary air is admitted to the outer end of the stub shaft through a rotatable coupling 112 and air line 113.

The heads 89 and 94 of the chuck 85 may be locked in closed position by means of a plurality of locking lugs 114 which are adapted to expand radially to engage flange 115 of the cylindrical member 116 secured to the plate 102. The lugs 114 are actuated by means of linkages 117 pivotably mounted about the pins 118. One leg 119 of the links is secured to a cylinder member 120 having a tapered end 121 which engages an annular taper 122 on the lugs to force the lugs radially outward of the cylindrical member 120 during axial movement thereof. The cylindrical member 120 is secured to a rod 123 which is reciprocally actuated by piston 124 operating within the cylinder 125 supplied with air through a rotating joint 126 and an air line 127. It is seen, then, that movement of the piston 124 in a direction toward the right as shown in Fig. 12 causes the links to move the lugs 114 radially to thereby lock the movable head 89 to the fixed head 94 and prevent the chuck from opening.

As further shown in Fig. 12 a guide ring 128 is secured to the flange 129 of the rod 123 by means of a radially extending rod 130. The guide ring 128 is provided with a radially extending flange 131 which rides within a notch 132 in the pivotable lever 133. It is apparent that the lever 133 will be pivoted about the pin 134 as the rod 123 is moved axially to actuate the locking lugs 114. Furthermore, the guide ring 128 is free to rotate with the chuck and the flange 129 will remain in engagement with the lever 133. A microswitch 135 is attached to a supporting plate 136 secured to the journaled ring 98 and is actuated by an arm 137 having a contact wheel 138 engaging the lever 133. The microswitch 135 will be actuated when the locking lugs 114 are extended to lock the chucking heads together and will be closed when the heads are in locked position.

The outer end 139 of the main shaft 73 is journaled within a collar 140 connected to the piston rod 141 of the drop cylinder 142. The cylinder 142 is supported on a bracket 143 welded to the arm 52. Air pressure supplied through the line 144 causes the rod 141 to be moved upwardly which pivots the main shaft 73 and the entire tire supporting unit about the axis of the stub shafts 67 and 68 to thereby lower the tire onto the tread supporting rollers 33 and 34. The outer end 139 of the main shaft is further provided with a counterweight 145 and a rotating coupling 146 through which the inflationary air is supplied to the airline 113. The stub shaft 68 is provided with arms 147 and 148 which respectively close microswitches 149 and 150 when the main shaft 73 is rotated about the stub shafts 67 and 68. Switch 149 is closed when the tire 28 is in "up" position and switch 150 is closed when the tire 28 is in "down" position.

A diaphragm lift 151 is supported within a bracket 152 which is secured to the base plate 45. The diaphragm 151 is provided with an adjustable rod 153 adapted to contact one of the rods 154 and 155 which project respectively from opposite sides of the housing 84. Whenever the tire is lowered into engagement with the tread supporting rollers 33 and 34 one of the rods 154 and 155 contacts the adjustable rod 153. After one shoulder has been cut, the diaphragm 151 is actuated by admission of air thereto to assist the drop cylinder 142 in raising the tire from engagement with the knives as quickly as possible. Air to the diaphragm 151 is controlled by a solenoid air valve (not shown) which is energized by the main timer as will be hereinafter described.

Referring to Fig. 17, lugs 156 and 157 are secured to and project from the main housing 69 and are provided with set screws 158 and 159 adapted to contact respectively sides 160 and 161 of tongue 162 which projects from a collar 163 secured to the main shaft 73. The set screws may be adjusted so as to minutely vary the limits of rotation of the main shaft 73 about its own axis. As previously described, the main shaft 73 is rotated about its own axis by the torque unit 77. The shaft 79 of the torque unit is provided with a collar 164 having a radially extending lug 165 which is adapted to contact the actuating arms 166 and 167 respectively of the microswitches 168 and 169 which control the operation of the chuck braking mechanism as hereinafter explained.

Figure 13:
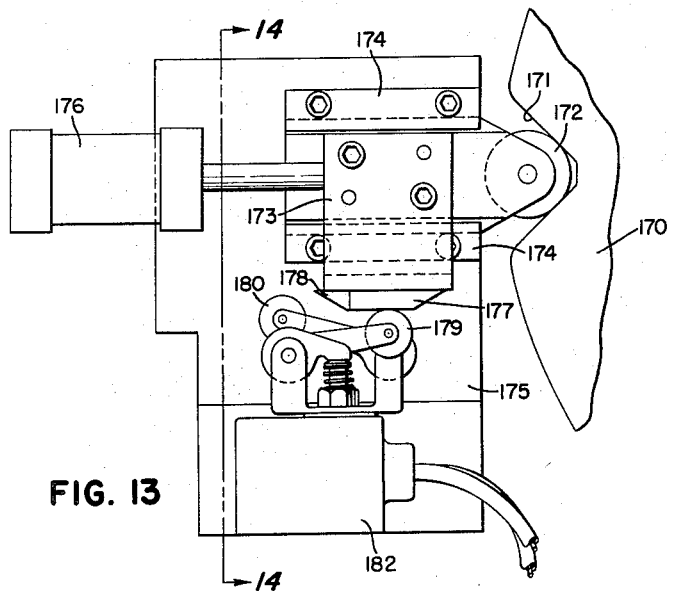
Fig. 13 is an enlarged plan view of the chuck brake mechanism.
Figure 14:
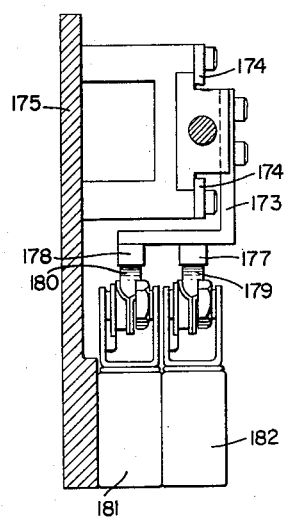
Fig. 14 is a sectional view taken along the lines 14—14 of Fig. 13.

Referring to Figs. 12 and 13, a cam wheel 170 is secured to the chucking head 94 and the outer periphery thereof is provided with a V-shaped notch 171. A cam roller 172 bearing against the cam wheel 170 is supported on a carriage 173 reciprocally mounted within a guide 174 which is secured to a support 175 mounted on the strut 95. The cam roller 172 is normally forced into engagement with the cam wheel 170 by means of a spring, but when it is desired to brake or hold the freely rotatable chuck against rotation a single acting cylinder 176 is actuated as hereinafter described. The carriage 173 is also provided with cams 177 and 178 which are adapted to engage cam rollers 179 and 180 respectively. Limit switch 181 actuated by cam 178 contacting the roller 180 provides the impulse required for activating the mechanism to lift the tire 28 from the knives after the cutting is complete, and lock the tire 28 against rotation whenever it is lifted off the knives. Limit switch 182 actuated by the cam 177 contacting the roller 179 provides the impulse required for slowing the speed of rotation of the knife carriage just before the tire is removed from the knives, as will be more fully described hereinafter.

*Operation and control circuits*

A bracket 183 is secured to the side of the torque unit 77 and supports a control panel 184 having a plurality of control push buttons mounted thereon. With the tire-holding and supporting unit in the loading position, as shown in Fig. 18, the operator places a tire onto the chuck head 94 and presses the "close tire chuck" button 185 on the control panel which completes the circuit through line 186 to energize the coil 187 of a solenoid valve which permits air to enter the cylinder 92 thereby closing the chuck 85. At this time, the "chuck lock on" button 188 is depressed which completes a circuit through the line 189 to the coil 190, provided the limit switch 96 has been closed as heretofore described indicating the chucks were closed. Energization of the coil 190 likewise opens a suitable solenoid valve to permit air to enter the cylinder 115 to actuate the locking lugs 114 described above to lock the chuck head 89 to the chuck head 94. The operator then depresses the "inflate tire" push button 191 which energizes the coil 192, provided the microswitch 135 has been closed by actuation of the locking lugs as heretofore described. Energization of the coil 192 opens a solenoid valve to permit air to pass through the line 113 to inflate the tire. After the operator has depressed the push buttons 185, 188, 191, the operating lever 55 is lifted to disengage the lug 56 from the slot 57 and the tire supporting unit is rotated clockwise as shown in Fig. 18 until the arm 52 engages the pin 54. The operator then lowers the lever 55 until the lug 56 engages the slot 58 so that the tire-holding and supporting unit is locked in the slitting position as shown in Fig. 19. The operator then depresses the "timer start" push button 193 to initiate the automatic cycle.

When the locking lever 55 is lowered into siping position, microswitch 60 is closed and remains closed so long as the tire is in siping position to maintain relay 194 energized, which closes relay contacts 194a and 194b so that when the push button 193 is depressed the main relay 195 is energized. Relay 195 instantaneously pulls in contact 195a completing the circuit to the timer motor 196 and the timer cam is indexed to its first position. At the first position of the timer cam contact 197 is opened so that the push button control station is inactivated and the contacts 198, 199, and 200 are closed maintaining the circuit to the timer and completing the circuit to the coils 201, 202, and 203 which respectively open valves to admit air to the drop cylinder 142, exhaust diaphragm 151, and the exhaust tire lock cylinder 176. As previously described, when air is admitted to the tire drop cylinder 142, the main shaft 73 is rotated about the stub shafts 67 and 68 and the tire 28 is lowered into engagement with the knives. The exhausting of the tire lock cylinder 176 permits the tire to be freely rotated by the knives and also causes microswitch 150 to be actuated which indexes the timer to its second position by energizing relay 195 through time delay relay 204 and normally open contact 204. At the second position, cams on the timer shaft open timer contacts 197, 199, and 200 and close timer contacts 205, 206, 207 and 208 so that the solenoid 209 is energized when the microswitch 149 is closed by the arm 147 when the tire is in full up position. After one shoulder of the tire has been slit and the tire rotated around its axis for 360°, limit switch 182 is closed by the cam roller 180 completing the circuit to the solenoid valve coils 210, 211, and 212 to admit air to the cylinder 142, diaphragm 151, and cylinder 176 which respectively pivot the main shaft 73 to lift the tire 28 off of the knife, and lock the tire against rotation after disengagement with the knives.

When the tire has reached its full up position, microswitch 149 is closed completing the circuit to the coil 209 of a solenoid valve controlling air to the torque unit 77 and the main shaft 73 is rotated counter-clockwise for 180 degrees to invert the tire. When the tire has been inverted, the microswitch 168 is closed and since contacts 205 and switch 148 are closed the timer motor is indexed to the third position through relay 195, opening the contacts 205, 206, and 207 and closing the contacts 198 and 199. When the contact 198 is closed, the coils 201, 202, and 203 are again energized to admit air to the drop cylinder 142 and exhaust air from the diaphragm 151 and the tire lock-out cylinder 176. Again, when the tire is in the full down position, the microswitch 150 will be closed and the timer will index to the fourth position through time delay relay 204.

Figure 22:
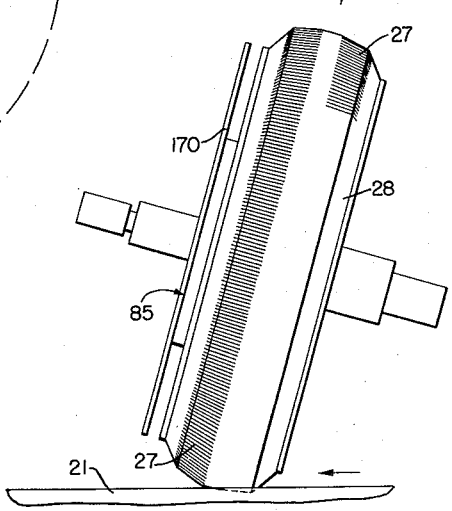
Fig. 22 is a partial elevational view similar to Fig. 19 showing the tire lowered into engagement with the knife.

The tire is now in cutting position on the knives, as shown in Fig. 22, and the timer has closed contacts 213, 214, and 215 and opened contacts 198 and 199. When the second side of the tire 28 has been completely slit, the cam roller 180 on the tire chuck closes microswitch 182 completing the circuit to the solenoid valve coils 210, 211, and 212 which respectively raise the tire to the up position, and lock it against rotation. The microswitch 149 is closed and the circuit to the solenoid valve coil 216 completed to admit air to the torque unit which revolves the tire from the 180° position to the original starting position, as shown in Fig. 19. When the tire reaches the starting position the microswitch 169 is actuated, indexing the timer to the zero position and closing the contact 217 to energize the solenoid valve coil 218 which opens a valve to deflate the tire. The automatic cycle of the machine is then completed and the operator lifts the lever 55 and swings the unit into loading position shown in Fig. 18. The operator then presses push buttons 219 and 220 which de-energize valve coils 221 and 222 respectively to retract the chuck locks and open the tire chuck so that the siped tire may be removed and replaced by an unsiped tire.

Figure 23:
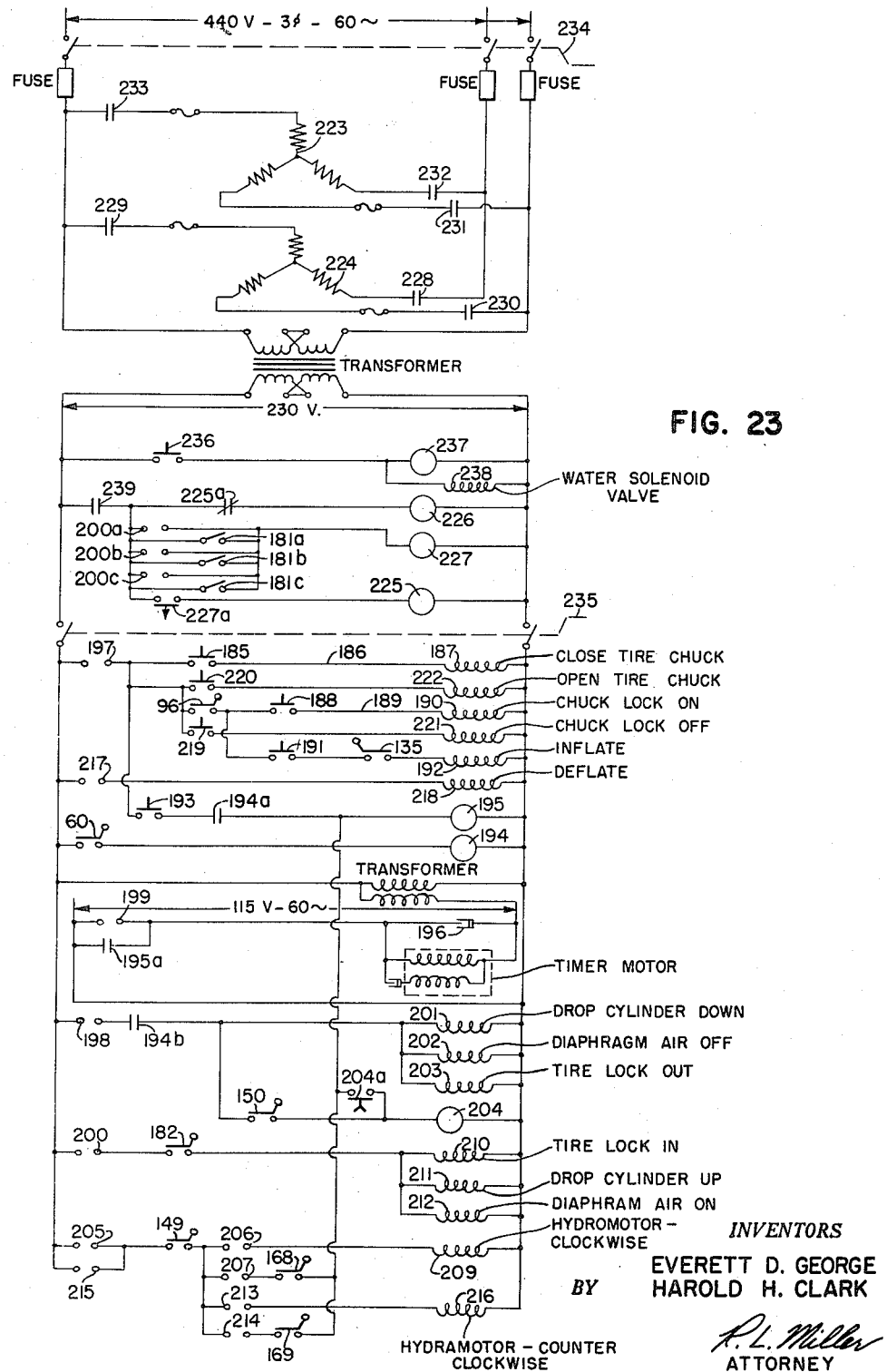
Fig. 23 is a schematic circuit diagram showing the means by which the operations of the machine are controlled.

The circuit to the motor 13, as illustrated in Fig. 23, includes a low-speed winding 223 and a high-speed winding 224 each of which is controlled by the relay 225 and 226 respectively. The motor 13 is operated at high speeds at all times except for a short period before a tire 28 is being placed on or taken off of the knife. It has been found that as the tire is placed onto or removed from the knives when they are operating at high speeds the knives tend to pull out chunks of rubber until the knives have reached full depth. Therefore, when the contact 200 is closed by the timer 196 just prior to the time that the tire is being lowered onto the knives and the circuit is completed to time delay relay 227 which closes a contact 227a energizing the relay 225. The relay 225 opens its normally closed contact 225a de-energizing relay 226. The contacts 228, 229, and 230 are opened when the relay 220 is de-energized thereby de-energizing the high-speed motor winding 224. In addition, energization of the relay 225 closes the contacts 231, 232, and 233 of the low-speed motor winding 223 and the knife will be rotated at low speed until after a short duration of time the timer opens contact 200a de-energizing relay 227 and after a time delay the contact 227a is opened to switch the motor from the low to high-speed windings.

After the tire has been slit by the knife and rotated for 360° the microswitch 181a is closed as previously explained to energize relay 227 which opens its normally open contact 227a to energize relay 225 and open the normally close contact 225a. The motor 13 is thereby switched from the high to the low windings and operates at low speed for a short duration until the microswitch 181a is opened a short time after the tire is removed from the knives. When the microswitch 181a is opened the circuit to the motor will return to the normal high-speed condition illustrated in Fig. 23 as previously explained.

Referring to Fig. 23, it is noted that whenever the main toggle switches 234 and 235 are closed the motor 13 will be operated at high speed so long as the switch 236 is closed which energizes the relay 237 and the solenoid valve coil 238 which admits water to the spray nozzles 32. Energization of the relay 237 closes contact 239. It is seen that so long as switch 236 is closed the motor 13 will be energized. Moreover, the motor control section of Fig. 23 contains contact 200b and microswitch 181b which are respectively closed by the timer and microswitch 181b on the second tire-supporting unit 3. Contact 200c and microswitch 181c are respectively closed by the timer and switch on the third tire-supporting unit 4. Since each of the contacts 200 and the switches 181 are connected in parallel, the motor 13 will be switched from high to low speed for a short duration of time whenever a tire is lowered onto the knife or disengaged therefrom at any of the three stations illustrated in Fig. 1 of the drawings.

While certain representative embodiments and details have been shown for the purpose of illustrating the invention, it will be apparent to those skilled in this art that various changes and modifications may be made therein without departing from the spirit or scope of the invention.

We claim:

1. A tire siping machine comprising in combination means for holding a tire in free rotatable position, a driven cutter carriage rotatable in a fixed plane having at least one helically-extending cutter which passes transversely across the tread of the tire, means for moving said holding means toward and away from said cutter, and supporting means contacting and driven by the tire, said supporting means being positioned adjacent the cutter carriage for positively limiting the depth of the cut.

2. A tire siping machine as claimed in claim 1 having control means for automatically moving the tire out of engagement with the cutter after one revolution of the tire.

3. A tire siping machine as claimed in claim 1 having means for revolving the tire and tire-supporting means for 180 degrees about an axis extending normal to the axis of said cutter carriage and in the plane of the tire.

4. A tire siping machine as claimed in claim 1 having means for pivotably moving the tire and tire-supporting means about an axis radially displaced outwardly from the carriage and parallel to the axis of said holder.

5. A tire siping machine as claimed in claim 1 having a plurality of tire-supporting means spaced circumferentially around said cutter.

6. A tire siping machine as claimed in claim 1 having means for applying a predetermined load on said tire and said rotatable supporting means.

7. A tire siping machine as claimed in claim 1 having means for reducing the speed of said carriage each time the tire is placed on or removed from engagement with said cutters.

8. A tire siping machine comprising in combination means for holding a tire in free rotatable position, a rotatable cutter carriage having at least one helically-extending cutter edge passing transversely across the tread of the tire, means for moving said holding means toward said cutter, movable supporting means contacting the tire and positioned adjacent the cutter carriage for positively limiting the depth of the cut, means for moving said supporting means into a plane at an acute angle to the plane of said carriage, and control means for automatically moving the tire out of engagement with the cutter edge after one revolution of the tire.

9. A tire siping machine as claimed in claim 8 having means for inverting the axis of the tire and tire-holding means 180 degrees about an axis extending normal to the axis of said carriage and in the plane of said tire.

10. A tire siping machine as claimed in claim 8 having means for pivotably moving the tire and tire-holding means about an axis radially displaced outwardly from said cutter carriage and parallel to the axis of said carriage.

11. A tire siping machine as claimed in claim 8 having a plurality of tire-supporting means spaced circumferentially around said cutter carriage.

12. A tire siping machine as claimed in claim 8 having means for applying a predetermined load on said tire against said movable supporting means.

13. A tire siping machine as claimed in claim 8 having means for reducing the speed of said cutter carriage each time a tire is placed in or removed from engagement with said cutter.

14. A tire siping machine comprising in combination means for holding a tire in free rotatable position, cutter carriage rotatable in a fixed plane having at least one helically-extending cutter mounted thereon and extending in a plane substantially parallel to the axis of rotation of the cutter, means for moving said supporting means toward said cutter, rotatable supporting means contacting the tire and positioned adjacent the cutter holder for positively regulating the depth of the cut, means for moving said tire-supporting means into a plane at an acute angle to the plane of said holder, control means for automatically moving the tire out of engagement with the cutter edge after the tire has made one revolution and means for turning the tire and tire-holding means diametrically for 180 degrees.

15. A tire siping machine as claimed in claim 14 having means for pivotally moving the tire and tire-supporting means about an axis radially displaced outwardly from said cutter carriage.

16. A tire siping machine as claimed in claim 14 having a plurality of tire-supporting means spaced circumferentially around said cutter.

17. A tire siping machine as claimed in claim 14 having means for applying a predetermined load on said tire against said rotatable supporting means.

18. A tire siping machine as claimed in claim 14 having means for reducing the speed of said cutter holder each time the tire is placed on or removed from engagement with said cutters.

19. A tire siping machine as claimed in claim 14 having means for pivotably moving the tire and tire-supporting means about an axis radially displaced outwardly from said cutter carriage.

20. A tire siping machine as claimed in claim 14 having a plurality of tire supporting means spaced circumferentially around said cutter.

21. A tire siping machine as claimed in claim 14 having means for applying a predetermined load on said tire against said rotatable supporting means.

22. A tire siping machine as claimed in claim 14 having means for reducing the speed of said cutter carriage each time the tire is placed into or removed from engagement with said cutters.

23. A tire siping machine comprising in combination a cutter carriage rotatable in a fixed plane having at least one helically-extending cutter secured thereto in a plane substantially parallel to the axis of rotation of the carriage, a plurality of units spaced circumferentially around said carriage, each unit holding a tire in free rotatable position, means for moving each holding unit toward said carriage, rotatable supporting means associated with each unit positioned adjacent the cutter holder for positively regulating the depth of the cut, means for moving each tire-holding means into a plane at an acute angle to the plane of said carriage, means for turning each tire and tire-holding means diametrically for 180 degrees, means for pivotably moving each tire and tire-holding means about an axis radially displaced outwardly from said cutter carriage.

24. A tire siping machine as claimed in claim 23 having means on each unit for applying a predetermined load on each tire respectively against each rotatable supporting means.

25. A tire siping machine as claimed in claim 23 having means for reducing the speed of said cutter carriage each time a tire is placed on or removed from engagement with said cutters.

26. A tire siping machine comprising means for holding a tire in freely rotatable position, a rotatable ring-shaped carriage, a plurality of arcuate radial inner knife holders secured to said carriage in longitudinal alignment, a plurality of radial outer knife holders secured to said carriage in series, each of said radial inner holders being offset longitudinally from an adjacent outer holder, a series cutter interposed between adjacent radial inner and radial outer holders, each cutter having length greater than the length of said holders, and a leading edge overlapping the trailing edge of the next succeeding cutter in the series, the leading edge of each cutter secured to a radial outer holder, the trailing edge secured to an adjacent radial inner holder and a spacer member interposed between the overlapping leading and trailing edges of the cutters.

27. A tire siping machine as claimed in claim 26 having means for securing the radial inner and radial outer holders together and means for pivotably securing each of the holders to said carriage.

28. A tire siping machine as claimed in claim 26 having means for removably securing said spacer to the radially inner and outer holders.

29. A tire siping machine comprising in combination means for holding a tire in freely rotatable position, a rotatable ring-shaped carriage having a plurality of helically-extending cutters secured thereto, means for moving said tire holding means toward and away from said cutters and a plurality of rollers positioned adjacent to and at both the radially inner and outer side of the carriage, the axis of said rollers disposed parallel to the axis of the tire and said rollers engaged by the tread of the tire for positively limiting the depth of the cut.

30. A tire siping machine as claimed in claim 29 having means for adjusting the position of said rotatable supporting means in a direction parallel to the axis of rotation of the carriage.

31. A method of slitting the shoulder portions of tires comprising holding the tire tread at an acuate angle to a horizontal plane, lowering the tire into engagement with a cutter moving transversely of the tread of the tire and in a plane normal to the tread, cutting a plurality of circumferentially spaced slits through the first shoulder portion of the tread and around the entire circumference of said shoulder with the cutter initially entering the shoulder of the tire for each cut, removing the tire out of engagement with the cutter after the first shoulder portion has been slit, turning the tire 180° about a great diameter thereof, lowering the tire into engagement with the cutters, cutting a plurality of circumferentially spaced slits on the other shoulder portion of the tread beginning 180° diametrically opposite the first slit cut on the first shoulder with the cutters initially entering the shoulder thereof for each cut and removing the tire out of engagement with the cutter after the opposite shoulder portion has been slit.

32. A method as claimed in claim 31 in which the speed of the cutter is reduced for a short period of time each time the tire is lowered into or removed from engagement with the cutters.

References Cited in the file of this patent

UNITED STATES PATENTS

| 1,444,909 | Gail | Feb. 13, 1923 |
| 2,202,894 | Bihler | June 4, 1940 |
| 2,704,122 | Watson | Mar. 15, 1955 |
| 2,717,639 | James | Sept. 13, 1955 |
| 2,752,996 | Riggs | July 3, 1956 |
| 2,754,905 | Kraft | July 17, 1956 |

FOREIGN PATENTS

| 90,759 | Sweden | Nov. 9, 1937 |